United States Patent [19]
Corghi

[11] Patent Number: 5,836,368
[45] Date of Patent: Nov. 17, 1998

[54] MACHINE FOR MOUNTING AND REMOVING TIRES ONTO AND FROM RESPECTIVE WHEEL RIMS

[75] Inventor: Remo Corghi, Correggio, Italy

[73] Assignee: Corghi - S.P.A., Strada Statle, Italy

[21] Appl. No.: 842,788

[22] Filed: Apr. 16, 1997

[30] Foreign Application Priority Data

May 3, 1996 [IT] Italy .................................. RE96A0028

[51] Int. Cl.[6] ................................................. B60C 25/135
[52] U.S. Cl. ........................................... 157/1.24; 157/1.1
[58] Field of Search .................................... 157/1.1, 1.17, 157/1.24, 1

[56] References Cited

U.S. PATENT DOCUMENTS

| | | | |
|---|---|---|---|
| 2,850,061 | 9/1958 | Twiford | 157/1.24 |
| 3,139,137 | 6/1964 | Wiles | 157/1.1 |
| 3,791,434 | 2/1974 | Duquesne | 157/1.24 |
| 4,694,875 | 9/1987 | Goebel | 157/1.24 |
| 4,765,387 | 8/1988 | Mannen | 157/1.24 |
| 4,811,774 | 3/1989 | Dale et al. | 157/1.24 |
| 4,830,079 | 5/1989 | Onuma | 157/1.24 |
| 4,884,611 | 12/1989 | Schmidt | 157/1.24 |
| 5,287,907 | 2/1994 | Kawabe et al. | 157/1.24 |

*Primary Examiner*—David A. Scherbel
*Assistant Examiner*—Joni B. Danganan
*Attorney, Agent, or Firm*—Birch, Stewart, Kolasch & Birch, LLP

[57] ABSTRACT

A machine for removing and mounting tires from and onto respective wheel rims has a base (1;20), a platform (3;22) rotating on the base, and a column (7; 26) which extends vertically upwards from the base to the side of the platform and supports, one following the other, two mutually slidable elements one of which carries at its end a tool (15; 33) which is to operate on the tire bead. The element which supports the tool is secured to the center of the wheel rim.

6 Claims, 5 Drawing Sheets

MACHINE FOR MOUNTING AND REMOVING TIRES ONTO AND FROM RESPECTIVE WHEEL RIMS

BACKGROUND OF THE INVENTION

Machines for mounting tires onto respective wheel rims and for performing the opposite operation are known comprising essentially a rotary platform having a vertical axis provided with self-centering means for locking the wheel rim, which is overlaid by a support supporting, in a manner adjustable both in height and in a horizontal direction, a tool arranged to interact with the edge, or bead, of the tire in order to urge it below, or extract it from, the edge of the wheel rim.

In known machines said tool is positioned at the end of a vertical support rod which slides within the end seat of a horizontal arm, to which the tool can be locked at a height.

The horizontal arm slides within the end seat of a vertical column which extends upwards from the machine base to the side of the platform which receives the tire.

Said horizontal arm is provided with means for locking it in the desired position.

Said configuration presents stability problems, which are particularly serious if operating on light alloy wheel rims.

In this respect, the tool is positioned at the end of a series of elements of substantial length which, if the tool is subjected to considerable stresses induced by its action on the tire bead, are deformed to the extent of causing the tool to slip against the wheel rim.

Contact between the wheel rim and tool has sometimes been prevented by providing the tool latter with a roller which slides on the wheel rim, to prevent damaging it.

Other solutions comprise means arranged to automatically distance the tool from the wheel rim, both in the vertical direction and radially, when said rod is fixed to said arm and said arm is fixed to the vertical column which supports it.

The known means have however proved ineffective in the case of light alloy wheel rims.

In this respect these latter are so delicate as not to be able even to support the wheel, and require that contact be absolutely avoided, even if a slide roller is interposed.

The elasticity of known tool support means offers no guarantee in this sense, in view of the minimal distance of just a few millimeters, which cannot be exceeded, between the tool and wheel rim.

BRIEF SUMMARY OF THE INVENTION

The object of the present invention is to provide a tool support structure in tire mounting and removal machines which overcomes the aforesaid drawbacks.

This object is attained according to the invention by a tool support structure which is secured, at least at one point, to the center of the wheel rim under operation.

The merits and the constructional and operational characteristics of the invention will be apparent from the detailed description given hereinafter with reference to the accompanying drawings, which show two embodiments thereof by way of non-limiting example.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
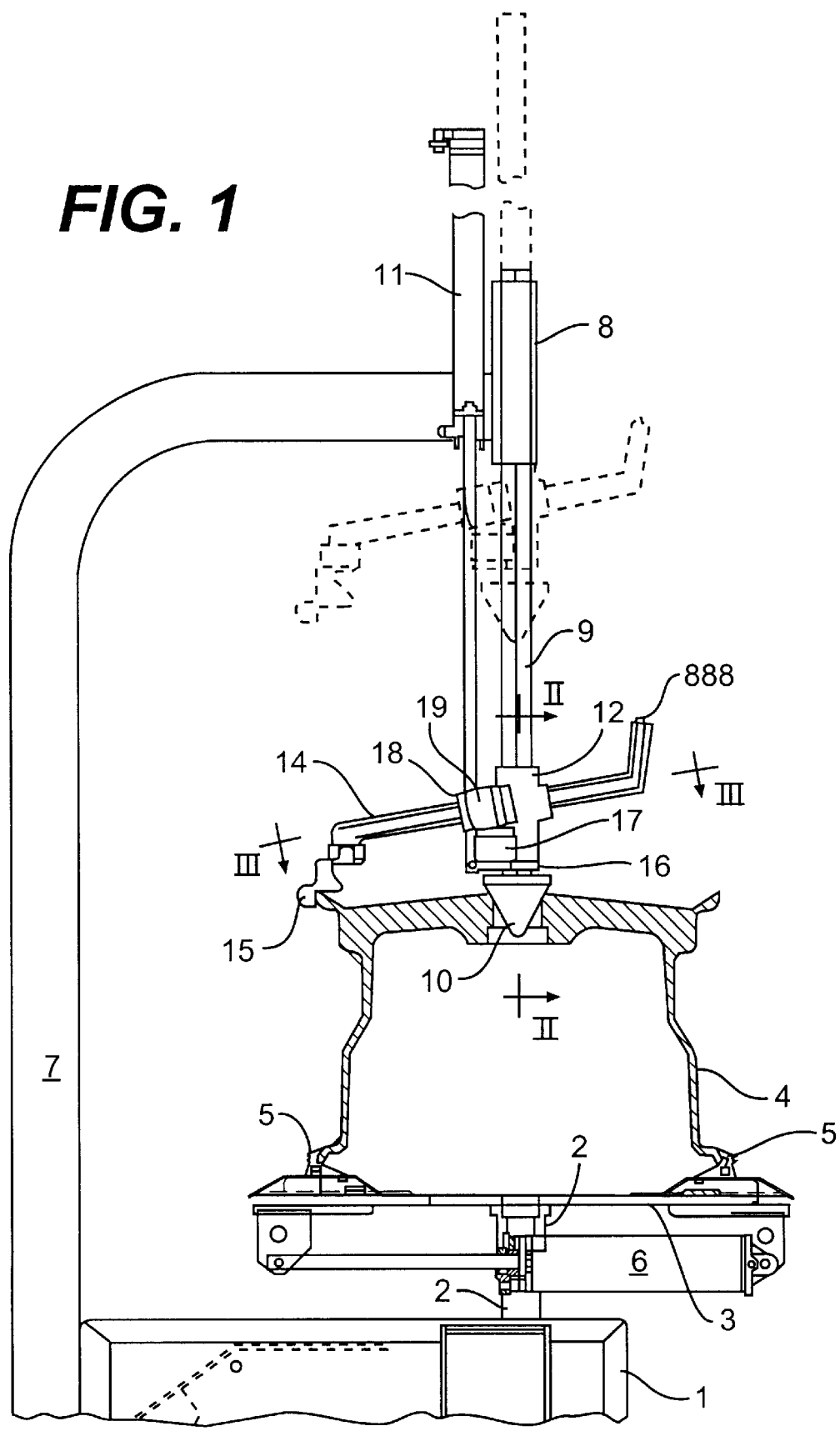
FIG. 1 is a side view of a first embodiment of a tire removal machine of the invention.
Figure 2:
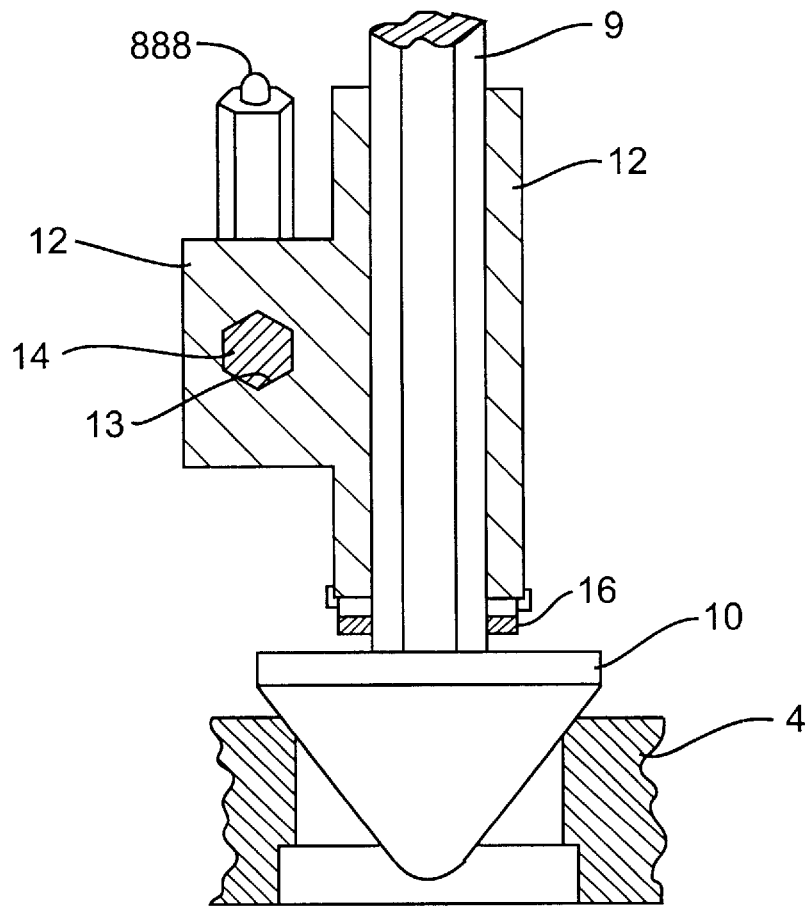
FIG. 2 is a section on the line II—II of FIG. 1.
Figure 3:
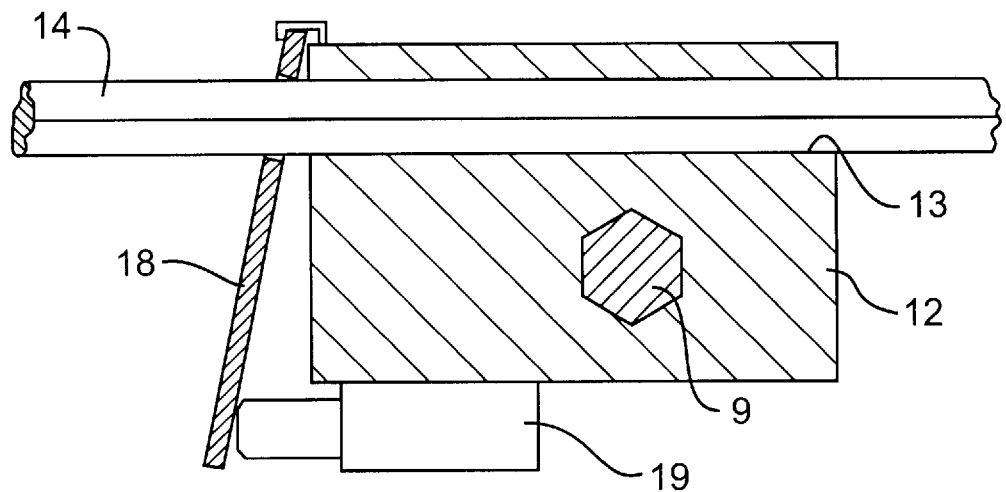
FIG. 3 is a section the line III—III of FIG. 1.

FIGS. 1 to 3 show the base 1 of the tire removal machine, from which there extends upwards in the usual manner a rotatable shaft 2 supporting the rotary platform 3 on which the wheel rim 4 is locked by self-centering jaws 5.

For completeness, it should be noted that the jaws 5 are made to undergo approach and withdrawal in the usual manner by a cylinder-piston unit.

From the base 1 there extends upwards to the side of the platform 3 the column 7, the first portion of which is vertical, after which it bends through 90° so that its end lies above the center of the platform 3, and hence above the center of the wheel rim 4.

To the end of the column 7 there is fixed a tube/sliding and guiding seat 8 having a vertical axis, within the inner prismatic section of which there freely slides a rod 9.

To the lower end of the rod 9 there is fixed a nosepiece or frusto-conical member 10 able to engage the central hole of the wheel rim 4.

The nosepiece 10 is fixed to the rod 9 in such a manner as to be able to rotate about its axis.

The vertical movements of the rod 9 are controlled by a cylinder-piston unit 11, the body of which is rigid with the column 7.

In an intermediate position between the nosepiece 10 and the tube 8 the rod 9 carries a slidable member 12 provided with a seat 13 inclined to the horizontal plane.

The seat 13 is polygonal in cross-section and slidingly carries an arm 14, the axis of which is contained in a chordal plane of the wheel rim.

The arm 14 is also polygonal in cross-section.

The arm 14 is inclined such that its lower end is closer to the column 7, to said end there being fixed the tool 15 intended to operate on the tire bead.

Said tool 15 is of the usual form and operates in the usual manner.

The member 12 and rod 9 are locked together by a clamping plate 16 operated by a cylinder-piston unit 17.

The plate 16 is positioned below the member 12 such that its tightening results in automatic raising of the member 12.

The arm 14 and the member 12 are likewise locked together by a clamping plate 18 operated by a cylinder-piston unit 19.

The clamping plate 18 is positioned on the side of the member 12 facing the column 7 so that when the clamping plate is tightened the tool 15 is automatically made to approach the column 7.

The travel movements caused by tightening the clamping plates 16 and 18 are such as to withdraw the tool 15 a certain distance from the edge of the wheel rim 4 both vertically and horizontally.

By resting on the center of the wheel rim, the structure comprising the column 7 and the rod 9 becomes sufficiently rigid so as not to deform under the action of the forces transmitted by the tool 15 when it interferes with the tire bead, hence ensuring the absence of undesirable contact between the tool 15 and the wheel rim 4.

Finally, the reference numeral 888 indicates means for operating said clamping devices.

Figure 4:
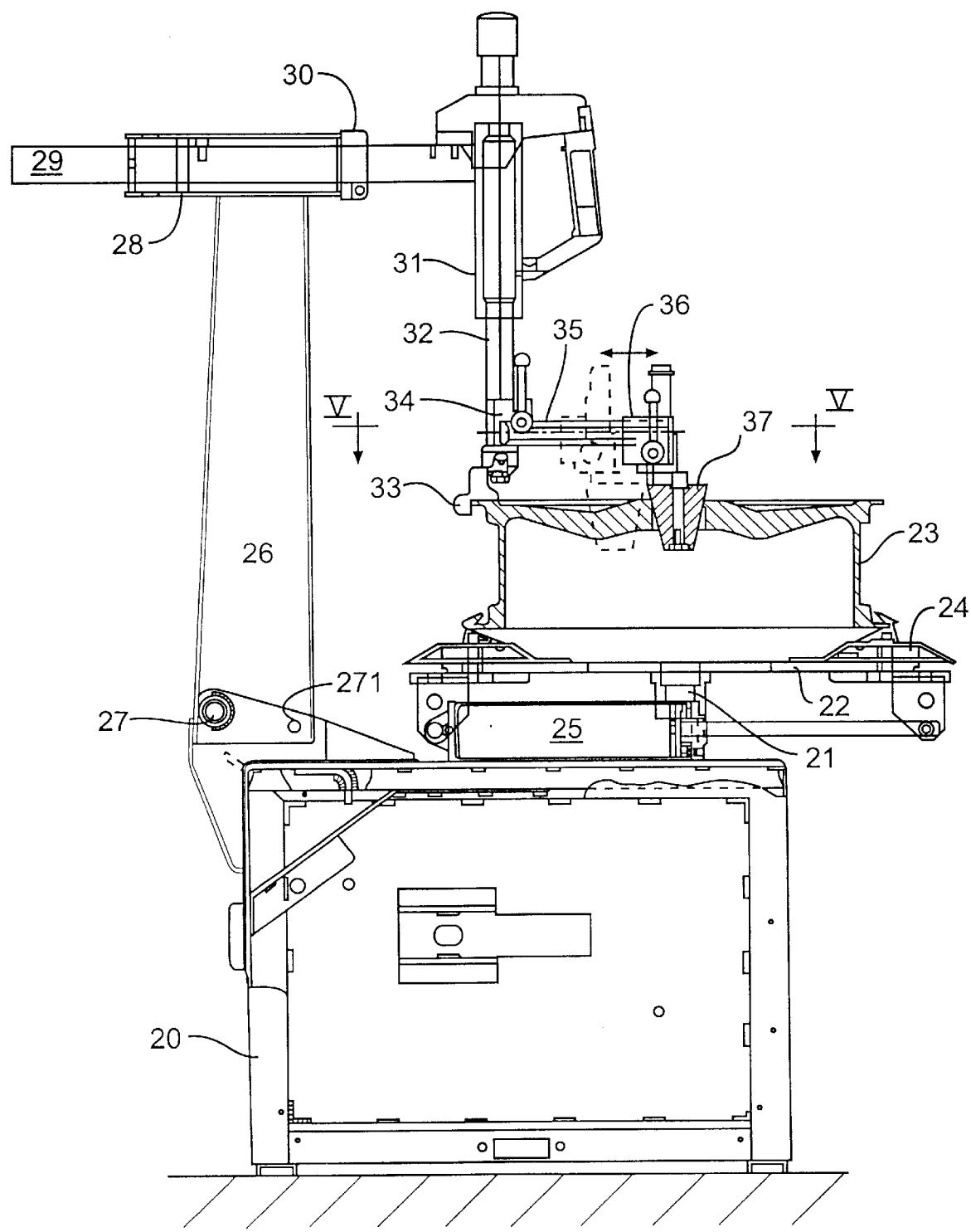
FIG. 4 is a side view of a second embodiment of a tire removal machine of the invention.
Figure 5:
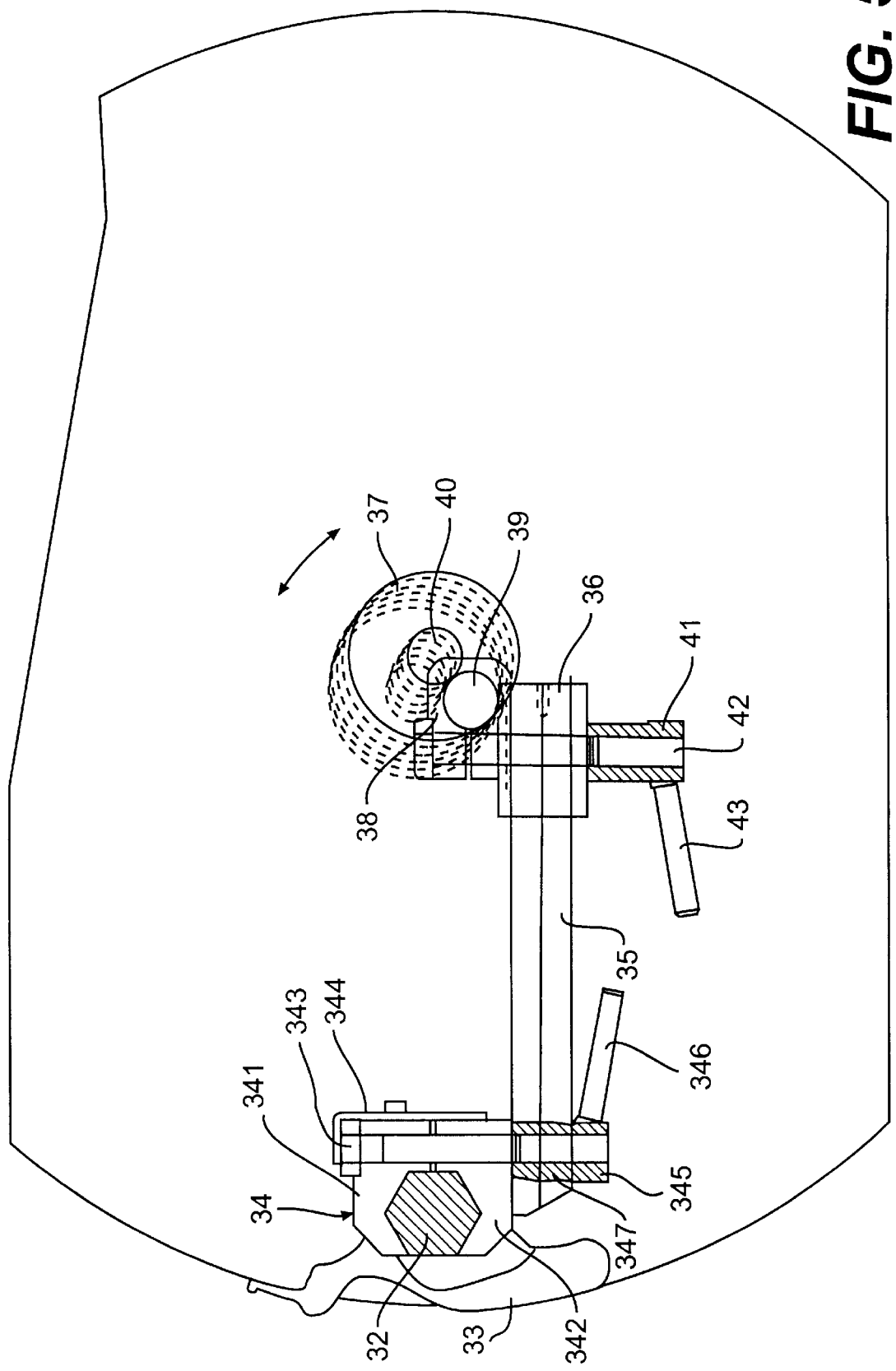
FIG. 5 is a section on the line V—V of FIG. 4.
Figure 6:
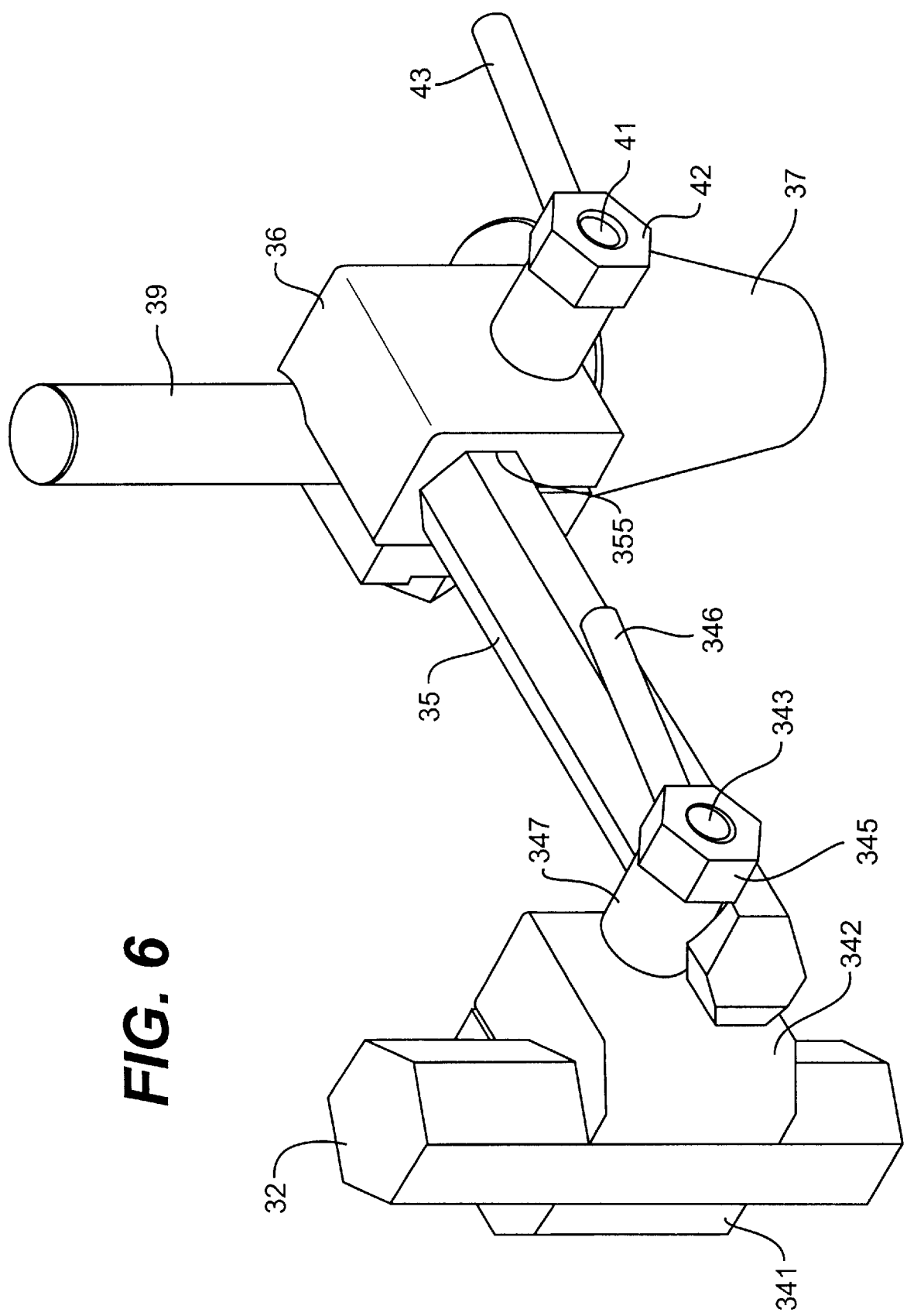
FIG. 6 is a perspective view of a detail of FIG. 5.

FIGS. 4 to 6 show a second embodiment of the invention, suitable for application to already existing tire removal machines.

Said figures show the base 20 of a traditional tire removal machine from which the rotary shaft 21 extends upwards to support the rotary platform 22.

The wheel rim 23 is placed on the platform 22 and maintained locked and centered thereon by usual self-centering jaws 24 operated by the piston 25.

To the side of the platform 22 there extends upwards the vertical column 26, which in the illustrated version can be inclined by rotation about the pivot 27, and is maintained in the vertical position by a catch 271.

At the top of the column 26 there is positioned a tube 28 with its axis perpendicular to that of the column, and in which there slides a polygonal arm 29.

The arm 29 is locked by a clamping plate 30, the operation of which automatically causes the arm 29 to travel towards the left in FIG. 4.

At the end of the arm 29 there is positioned a tube 31 having vertical axis within which a rod of prismatic section slides freely.

The rod 32 is locked to the tube 31 by a clamping device, not shown, which when tightened automatically causes the rod 32 to undergo a small upward movement.

The usual tool 33 for interacting with the tire bead is fixed to the lower end of the rod 32.

According to the invention, above the tool 33 the rod 32 carries a first slidable member 34 supporting a horizontal arm 35.

On the horizontal arm 35 there slides a second member 36 carrying a conical member 37 to be securely inserted into the central hole in the wheel rim 23.

From FIGS. 5 and 6 it can be seen that the slidable member 34 is composed of two jaws 341 and 342 arranged to clamp the rod 32.

Between the two jaws 341 and 342 there acts a bolt 343 maintained in position by the bracket 344, and screwed into a nut 345 having an operating appendix/lever.

The nut is positioned to the side of the horizontal arm 35, and is in contact with the jaw 342 by virtue of the spacer 347 which is integral with said nut.

The arm 35 is welded to the jaw 342 and carries said slidable member 36 as stated.

The member 36 comprises two mutually perpendicular clamping seats, of which one 355 accommodates the arm 35, and the other 38 accommodates a first pin 39.

To the first pin 39 there is fixed a second pin 40, parallel to but non-aligned with the first pin, and coaxial to and rigid with the conical member 37.

By virtue of the non-alignment, the axis of the conical member 37 can be located exactly in the vertical plane passing through the axis of the rod 32.

The conical member 37 is clamped onto the arm 35, and the rod 39 onto the member 36, by a single bolt 41 which is inserted through a seat perpendicular to the axis of both said clamping seats, and is screwed into a nut 42 provided with an operating appendix/lever 43.

The operation of the device is evident.

The operator manually brings the tool 33 into contact with the edge of the wheel rim 23, and then locks it in position by operating clamping devices, which automatically results in separation from the wheel rim.

The operator then inserts the conical member 37 into the central hole in the wheel rim, and locks it by means of the nuts 345 and 41.

In this manner, by virtue of the invention a very rigid support structure for the tool 33 is obtained, hence preventing deformation which could cause undesired contact between the tool and the wheel rim.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A machine for removing and mounting tires from and onto respective wheel rims comprising:

a base;

a rotary platform supported for rotation on the base;

a column extending vertically upwards from the base to a side of the platform; and first and second mutually slidable elements supported on the column, the second mutually slidable element having a first portion for supporting thereon a tool for operating on a tire bead and a second portion for securing to a center of the wheel rim.

2. The machine as claimed in claim 1, wherein the column extends upwardly from the base to the side of the platform and is curved above the platform, said first mutually slidable element being a sliding and guiding seat secured to an end of the column, the sliding and guiding seat having a vertical axis, coaxial with the rotary platform, said second mutually slidable element further including:

a rod supported by the sliding and guiding seat, said second portion of said mutually slidable element being a frusto-conical member secured to an end of said rod for locking into the center of the wheel rim; and a member slidingly mounted to the rod, said first portion of said second mutually slidable element being an arm slidingly mounted to said member for supporting the tool thereon.

3. The machine as claimed in claim 2, wherein said member of said second mutually slidable element includes two substantially mutually perpendicular seats within which said rod and said arm slide, wherein said second mutually slidable element further includes a clamping plate operated by a pneumatic cylinder-piston unit associated with each of the guide seats, the clamping plate being mounted for inclined movement to lock the rod or arm and simultaneously space the tool from an edge of the wheel rim.

4. The machine as claimed in claim 1, wherein said first mutually slidable element includes a first tube supported on the column and extending substantially horizontally with respect thereto, said second mutually slidable element further comprising:

a slidable arm supported by said first tube;

a second tube supported at an end of the slidable arm and extending substantially vertically with respect thereto, said first portion of said second mutually slidable element being a vertical rod supported and guided by the second tube for supporting the tool thereon;

a first slidable member carried by said vertical rod;

a horizontal arm supported by said first slidable member; and a second slidable member supported by said horizontal arm, said second portion of said second mutually slidable element being a frusto-conical member carried by said second slidable member for locking into the center of the wheel rim.

5. The machine as claimed in claim 4, wherein said second slidable member of said second mutually slidable element further includes:

two mutually perpendicular seats, said horizontal arm being supported and guided by one of said mutually perpendicular seats;

a first vertical pin supported and guided by a second of said mutually perpendicular seats; and a second vertical pin rigid with said first vertical pin, said second vertical pin being parallel to but non-aligned with the first vertical pin, said frusto-conical member being fixed to an end of the second vertical pin.

6. The machine as claimed in claim 5, wherein said second mutually slidable element further includes:

a single bolt for moving said two mutually perpendicular seats for simultaneously locking said horizontal arm and said first vertical pin within said seats; and a lever for operating said bolt.

* * * * *